US006766611B2

(12) United States Patent
Prince

(10) Patent No.: US 6,766,611 B2
(45) Date of Patent: Jul. 27, 2004

(54) CARPENTER BEE TRAP

(75) Inventor: Bruce H. Prince, 1352 Upper Grandview Rd., Jasper, GA (US) 30143

(73) Assignee: Bruce H. Prince, Jasper, GA (US)

( * ) Notice: Subject to any disclaimer, the term of this patent is extended or adjusted under 35 U.S.C. 154(b) by 0 days.

(21) Appl. No.: 09/818,347

(22) Filed: Mar. 27, 2001

(65) Prior Publication Data

US 2001/0047612 A1 Dec. 6, 2001

Related U.S. Application Data

(60) Provisional application No. 60/192,239, filed on Mar. 27, 2000.

(51) Int. Cl.[7] ............................................... A01M 1/10
(52) U.S. Cl. ................................. 43/58; 220/690; 220/6
(58) Field of Search ................................ 43/66, 38, 65, 43/107, 122; 119/428; 229/117.01, 122.2, 149, 195; 220/6, 690

(56) References Cited

U.S. PATENT DOCUMENTS

| | | | |
|---|---|---|---|
| 835,264 A | | 11/1906 | Steinmann |
| 970,944 A | | 9/1910 | Odatey |
| 1,091,550 A | | 3/1914 | Walters |
| 1,364,949 A | | 1/1921 | Niewinski |
| 3,803,753 A | * | 4/1974 | Feigin et al. .............. 119/131 |
| 3,872,619 A | * | 3/1975 | McIlwain ..................... 43/60 |
| 4,551,941 A | * | 11/1985 | Schneidmiller .............. 43/107 |
| 4,858,374 A | * | 8/1989 | Clemons ...................... 43/122 |
| D306,061 S | * | 2/1990 | Cutter ....................... D22/122 |
| 5,305,546 A | * | 4/1994 | Edwards ...................... 43/134 |
| 5,339,563 A | * | 8/1994 | Job ............................ 43/107 |
| 5,448,852 A | * | 9/1995 | Spragins ...................... 43/131 |
| 5,493,997 A | * | 2/1996 | Ritchey ....................... 119/23 |
| 5,685,109 A | * | 11/1997 | Rimback ..................... 43/122 |
| 6,170,437 B1 | * | 1/2001 | Jones ......................... 119/428 |

* cited by examiner

Primary Examiner—Charles T. Jordan
Assistant Examiner—Susan C. Alimenti
(74) Attorney, Agent, or Firm—Jenkens & Gilchrist

(57) ABSTRACT

A carpenter bee trap comprises a housing having a hollow interior and at least one solid wall having a hole formed therein to permit carpenter bees to enter the hollow interior of the housing, the hole having about the same size as holes normally made by carpenter bees so that the hole tends to attract such bees. The preferred hole size is in the range from about 5/16 inch to about ½ inch. The exterior surface of the solid wall around the hole preferably has a light color, and the walls of housing are preferably opaque so that the hole appears dark from outside the housing. The interior surface of the solid wall forming the interior edge of the hole is preferably substantially flat. The trap may be made of a single piece of molded plastic with molded hinges connecting selected pairs of adjacent walls, and including integral latching means for releasably latching selected pairs of adjacent walls.

17 Claims, 5 Drawing Sheets

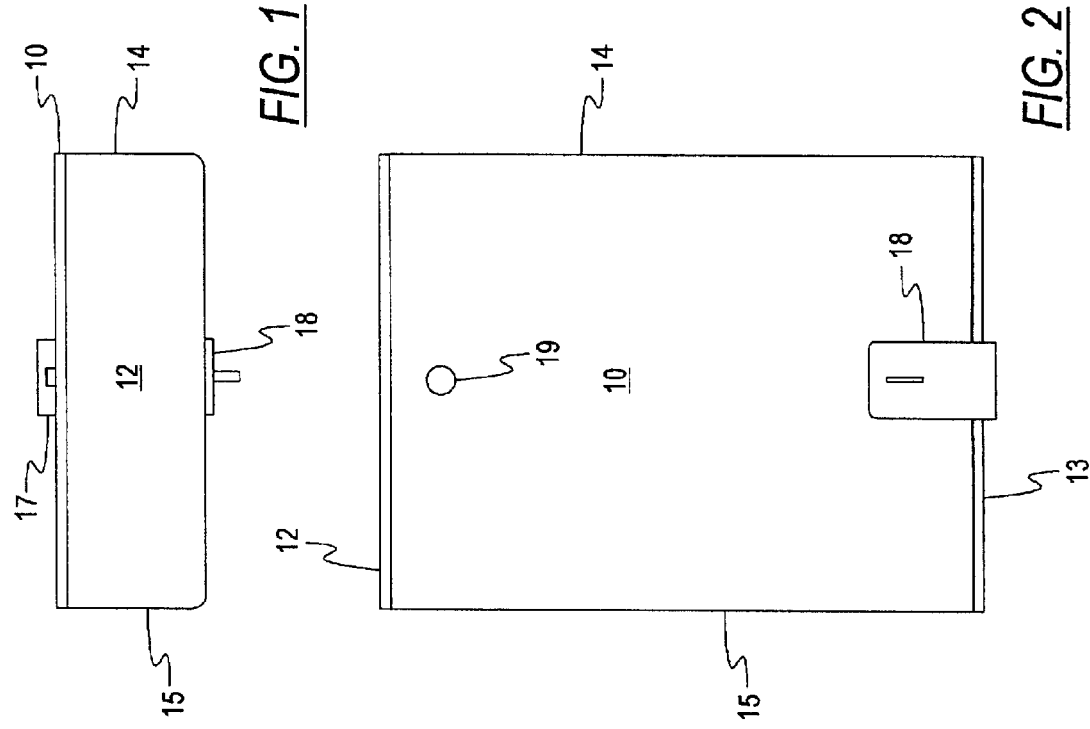

CARPENTER BEE TRAP

CROSS-REFERENCE TO RELATED APPLICATIONS

This application claims the benefit of priority of U.S. Provisional Patent Application Serial No. 60/192,239 filed on Mar. 27, 2000.

FIELD OF THE INVENTION

This invention relates generally to insect traps and, more particularly, to a trap for carpenter bees.

BACKGROUND OF THE INVENTION

Carpenter bees are a problem in certain geographical regions because they tend to bore holes in various wooden structures, including houses. Once the wooden facade of a house has been penetrated by these bees, they can spread through the interior of the house, becoming a nuisance and causing physical damage and sometimes even physical harm to occupants. Thus, there has been a need for a trap for these pests in the vicinity of wooden structures to be protected from them.

It is a primary object of the present invention to provide such a trap which is effective in trapping carpenter bees and can be efficiently and economically manufactured in large numbers.

SUMMARY OF THE INVENTION

In accordance with the present invention, there is provided a carpenter bee trap comprising a housing having a hollow interior and at least one solid wall having a hole formed therein to permit carpenter bees to enter the hollow interior of the housing, the hole having about the same size as holes normally made by carpenter bees so that the hole tends to attract such bees. The preferred hole size is in the range from about 5/16 inch to about ½ inch. The interior surface of the solid wall forming the interior edge of said hole is substantially flat. The exterior surface of the solid wall around the hole preferably has a light color, and the walls of housing are preferably opaque so that the hole appears dark from outside the housing. The interior surface of the solid wall forming the interior edge of the hole is preferably substantially flat. In a particularly preferred embodiment, the trap is made of a single piece of molded plastic with molded hinges connecting selected pairs of adjacent walls, and including integral latching means for releasably latching selected pairs of adjacent walls.

BRIEF DESCRIPTION OF THE DRAWINGS

The invention may best be understood by reference to the following description taken in conjunction with the accompanying drawings, in which:

FIG. 1 is a top plan view of a carpenter bee trap embodying the invention;

FIG. 2 is a front elevation of the carpenter bee trap shown in FIG. 1;

FIG. 3 is a side elevation of the carpenter bee trap shown in FIGS. 1 and 2;

DETAILED DESCRIPTION OF THE PREFERRED EMBODIMENTS

Figure 4:
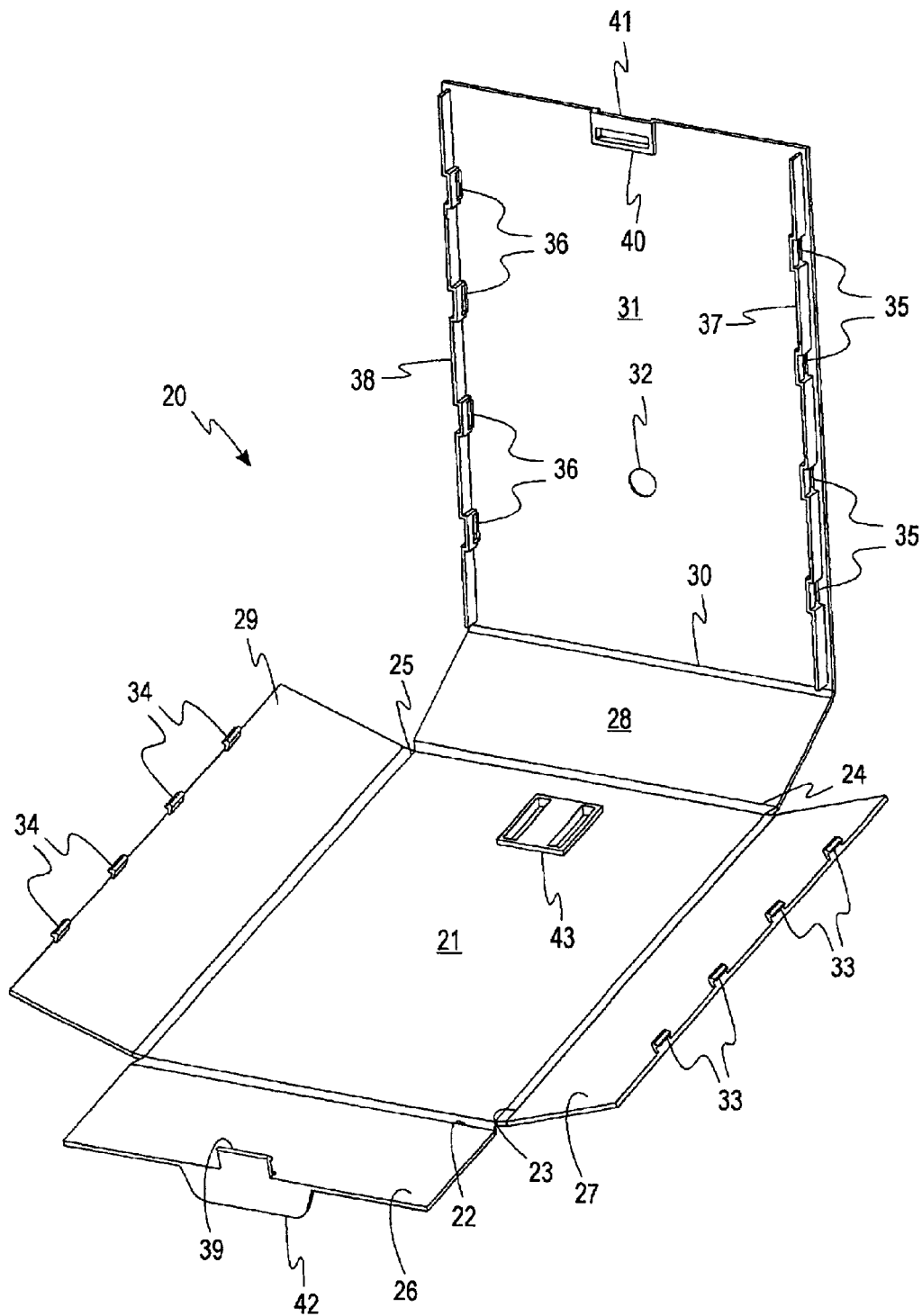
FIG. 4 is an exploded perspective view of a modified carpenter bee trap embodying the invention.

Although the invention will be described next in connection with certain preferred embodiments, it will be understood that the invention is not limited to those particular embodiments. On the contrary, the description of the invention is intended to cover all alternatives, modifications, and equivalent arrangements as may be included within the spirit and scope of the invention as defined by the appended claims.

Turning now to the drawings, and referring first to FIGS. 1–3, there is shown a carpenter bee trap that is essentially a rectangular plastic housing formed by six walls, including front and rear walls 10 and 11, top and bottom walls 12 and 13, and a pair of side walls 14 and 15. The bottom and rear walls 13 and 14 are connected by a hinge 16 so that the bottom wall 13 can be pivoted downwardly away from the bottom edge of the front wall 10 to permit removal of bees trapped inside the housing. The exterior surface of the rear wall 14 is also equipped with a plastic hanger 17 to facilitate mounting of the trap on a supporting surface. The hinged bottom wall 13 also carries a hinged plastic hasp 18 which permits the bottom wall 13 to be latched to, and unlatched from, the front wall 10.

It has been found that carpenter bees will enter an opening having a size similar to the size of the holes that carpenter bees normally form in wooden structures. The size of such holes is typically within the range from about 5/16 in. to about ½ inch in diameter. A hole 19 of this size is provided in the front wall 10, near the top of the wall. To improve the visibility of the hole 19, the exterior surface of the front wall 10 of the housing, at least the region surrounding the hole 19, preferably has a light color such as light gray or tan to provide a sharp contrast with the dark hole. After a bee enters the housing through the hole 19, it is difficult for the bee to re-enter the hole from inside the house and escape. Consequently, most bees that enter the hole 19 from outside the housing become trapped within the housing and eventually die from lack of nourishment and moisture. To make it even more difficult for the bee to escape from the housing once inside, the inside walls of the housing are preferably made with a smooth surface so that there is no frictional surface that the bee can use to crawl toward the hole through which it entered the housing.

FIGS. 4–10 illustrate a modified version of the trap comprising a single molded plastic part 20 forming multiple molded hinges that permit the trap to be packaged and shipped as a substantially flat sheet, and then quickly and easily assembled when removed from the package by a user. The molded plastic part 20 forms a rear panel 21 that has four molded hinges 22, 23, 24 and 25 extending along its four sides. These four hinges 22–25 join the rear panel 21 with a bottom panel 26, a right side panel 27, a top panel 28, and a left side panel 29, respectively. A fifth molded hinge 30 extends along the second elongated edge of the top panel and joins the top panel to a front panel 31 that forms a hole 32 through which bees enter the trap.

Figure 5:
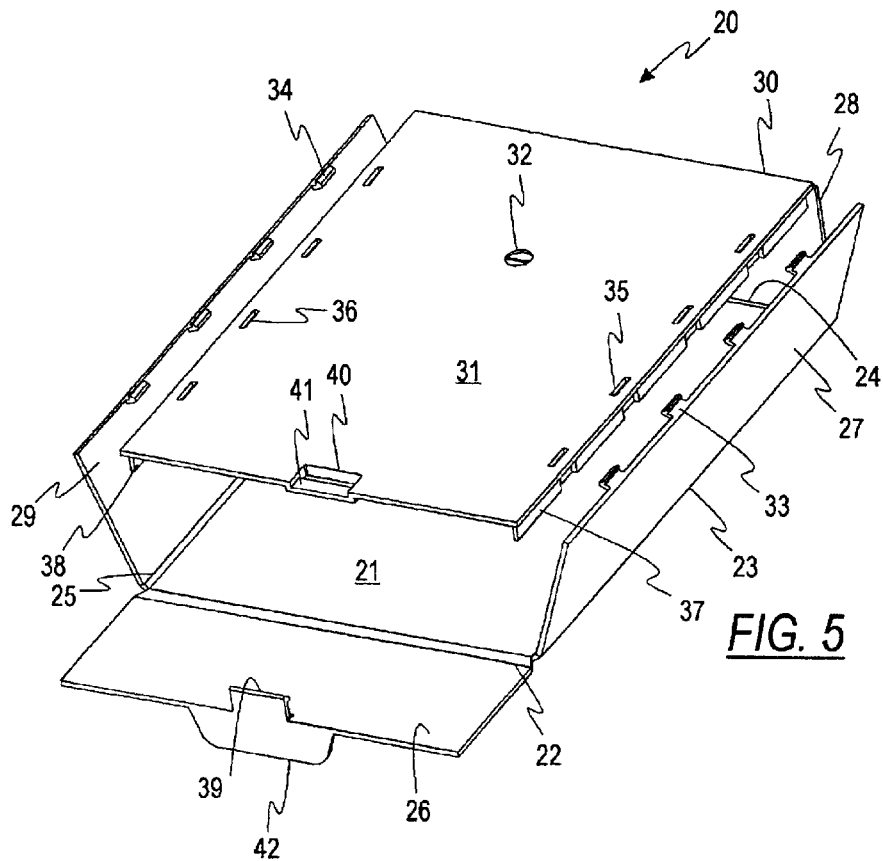
FIG. 5 is a perspective view of the trap shown in FIG. 4 in a partially assembled form.
Figure 6:
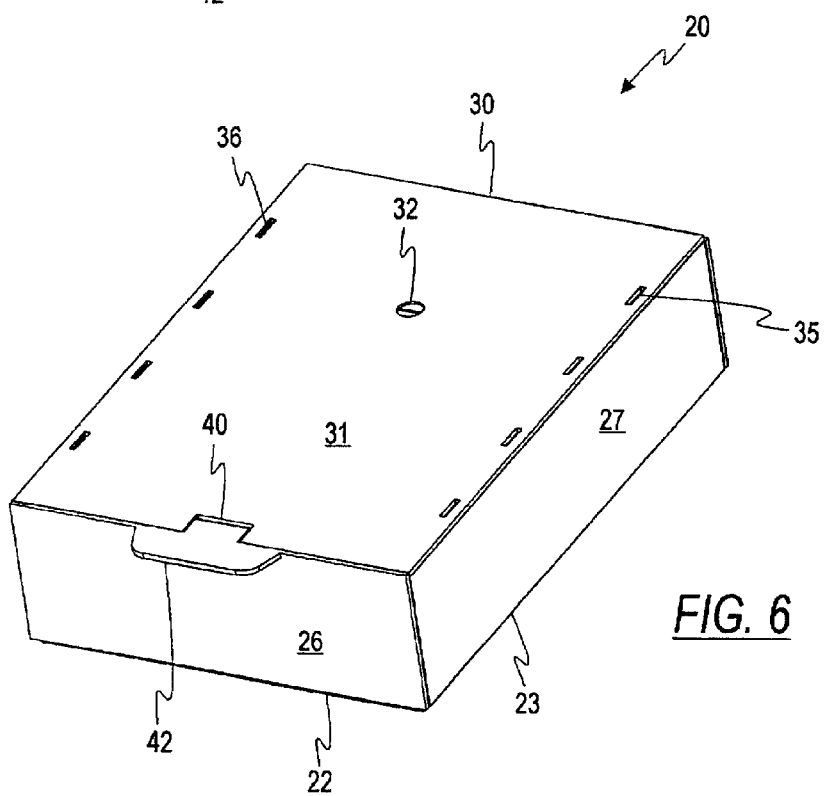
FIG. 6 is a perspective view of the trap shown in FIG. 4 in a fully assembled form.
Figure 7:
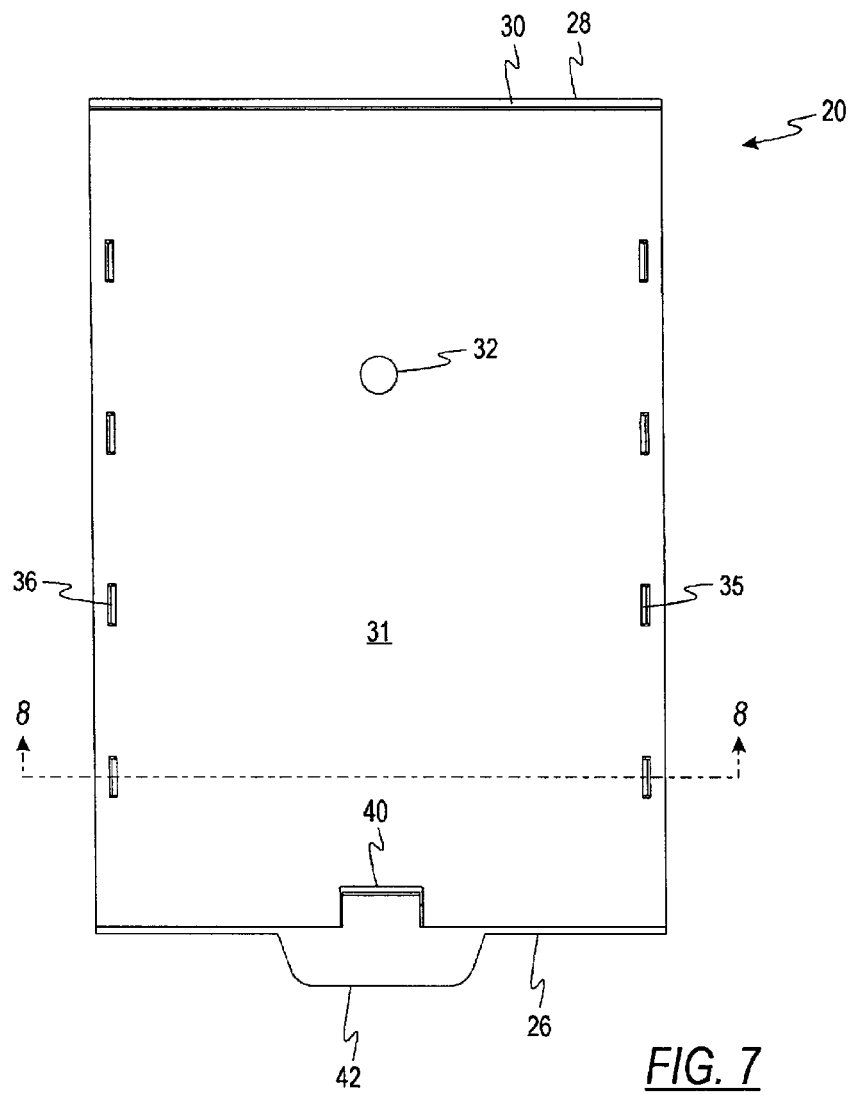
FIG. 7 is an enlarged front elevation view of the trap shown in FIG. 6.
Figure 8:
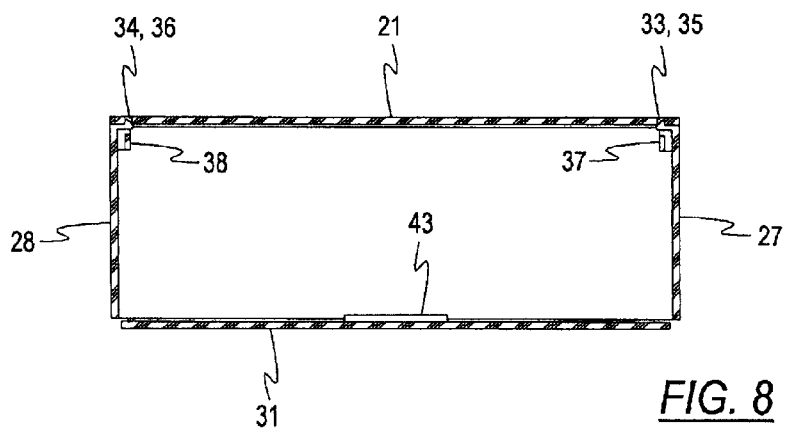
FIG. 8 is a sectional view taken along line 8—8 in FIG. 7.
Figure 9:
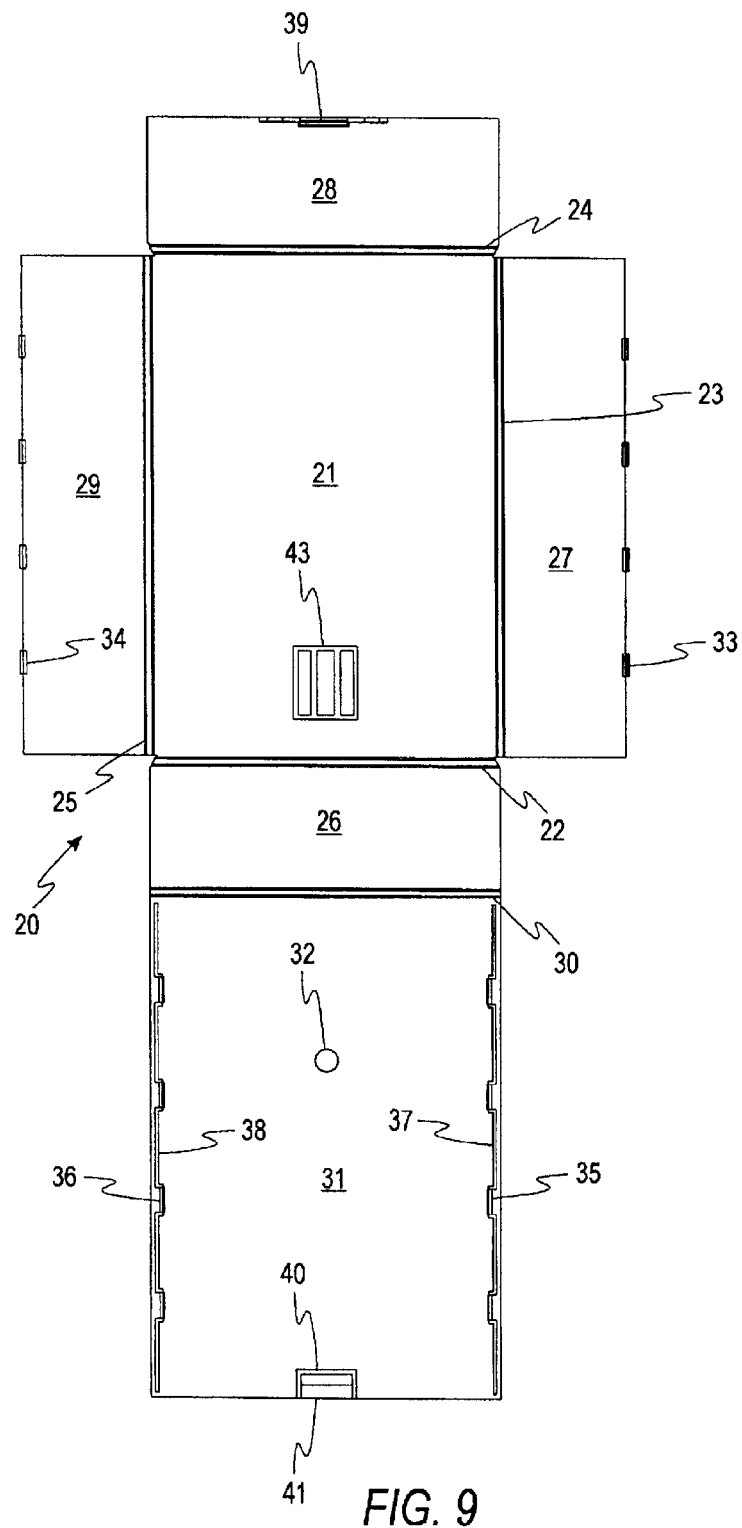
FIG. 9 is a plan view of the trap shown in FIG. 4 with all the parts laid out flat in a common plane.
Figure 10:
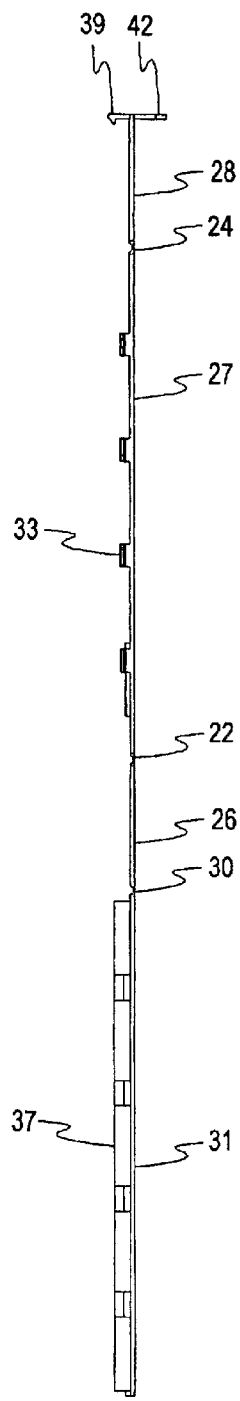
FIG. 10 is side elevation of the parts shown in FIG. 9.

As can be seen in FIGS. 9 and 10, the molded plastic part 20 can be flattened for packaging and shipping, so that a large number of traps can be efficiently packaged and shipped together in a package that contains little empty space by simply stacking multiple parts 20 on top of each other in their flattened condition. When it is desired to assemble the trap, the top panel 28 and the front panel 31 hinged thereto are folded toward the rear panel 21, as illustrated in FIGS. 4 and 5. When the front panel 31 is aligned with the rear panel 21, the two side panels 27 and 29 are folded toward the front panel 31 and pressed against the side edges of the front panel 31 so that multiple lugs 33 and 34 on the front edges of the side panels 27 and 29, respectively, snap into mating slots 35 and 36 formed in the front panel 31 along its two side edges. The lugs 33 and 34 have beveled leading edges that serve as cams to bend the lugs slightly as they engage the side edges of the front panel 31 and slide over the inside surface of that panel until they snap into the slots 35 and 36. Engagement of the lugs 33, 34 in the slots 35, 36 locks the side panels 27 and 29 to the front panel 31. The front panel 31 also forms a pair of integral flanges 37 and 38 that engage the inside surfaces of the side panels 27 and 29 when the panels are all locked together.

The final step in the assembly operation is to fold the bottom panel 26 toward the bottom edge of the front panel 31 until an integral latching lug 39 on the front edge of the bottom panel 26 engages a mating slot 40 in the front panel 31. As can be seen in FIG. 5, the leading edge of the latching lug 39 is beveled to serve as a cam that bends the latching lug slightly away from the front panel 31 as the lug engages the bottom edge of the front panel 31 and slides across the surface of a recess 41 leading from the bottom edge of the panel 31 to the slot 40. When the lug 39 reaches the slot 40, it snaps into the slot to latch the bottom panel 26 to the front panel 31. When the user wishes to remove trapped bees from the trap, an integral flange 42 depending from the latching lug 39 is pressed to release the lug from the slot 40, and then the bottom panel 26 can be pivoted downwardly to open the interior of the trap and remove the trapped bees.

As can be seen in FIGS. 4 and 9, an integral hanger 43 is molded into the inside surface of the rear panel 21 to facilitate mounting of the trap. If desired, an attractant for the bees may also be placed in the interior of the trap.

What is claimed is:

1. A carpenter bee trap comprising a housing having a hollow interior and at least one solid wall having a hole formed therein to permit carpenter bees to enter the hollow interior of the housing, said hole having about the same size as holes normally made by carpenter bees so that the hole tends to attract such bees, said housing containing no bait, the interior surface of said solid wall forming the interior edge of said hole is substantially flat.

2. The carpenter bee trap of claim 1 in which said housing has only a single hole, and the exterior surface of said solid wall around said hole has a light color, and the walls of said housing are opaque so that said hole appears dark from outside the housing.

3. The carpenter bee trap of claim 1 in which at least one of the walls of said housing can be pivoted away from adjacent walls to permit the hollow interior of the housing to be opened for the removal of trapped bees.

4. The carpenter bee trap of claim 1 in which the interior surfaces of said housing are smooth.

5. The carpenter bee trap of claim 1 which is made of a single piece of molded plastic with molded hinges connecting selected pairs of adjacent walls, and including integral latching means for releasably latching selected pairs of adjacent walls.

6. The carpenter bee trap of claim 1 in which said hole as a diameter within the range of from about 5/16 inch to 1/2 inch.

7. A carpenter bee trap comprising a housing made of single piece of molded plastic with molded hinges connecting selected pairs of adjacent walls, and including integral latching means for releasably latching selected pairs of adjacent walls, said housing having a hollow interior and at least one solid wall having a hole formed therein to permit carpenter bees to enter the hollow interior of the housing, said hole having about the same size as holes normally made by carpenter bees so that the hole tends to attract such bees, said housing containing no bait, the exterior surface of said solid wall around said hole having a light color, and the walls of said housing being opaque so that said hole appears dark from outside the housing.

8. The carpenter bee trap of claim 7 in which at least on of the walls of said housing can be pivoted away from adjacent walls to permit the hollow interior of the housing to be opened for the removal of trapped bees.

9. The carpenter bee trap of claim 7 in which the interior surfaces of said housing are smooth.

10. The carpenter bee trap of claim 7 in which said hole a diameter within the range of from about 5/16 inch to 1/2 inch.

11. A carpenter bee trap comprising a housing made of single piece of molded plastic with molded hinges connecting selected pairs of adjacent walls, and including integral latching means for releasably latching selected pairs of adjacent walls, and housing having a hollow interior and at least one solid wall having a hole formed therein to permit carpenter bees to enter the hollow interior of the housing, said hole having about the same size as holes normally made by carpenter bees so that the hole tends to attract such bees, said housing containing no bait, the interior surface of said solid wall forming the interior edge of said hole is substantially flat.

12. A method of trapping carpenter bees without the use of bait or insecticide comprising providing a housing having a hollow interior and at least one solid wall having an exposed hole formed therein to permit carpenter bees to enter the hollow interior of the housing, said hole having about the same size as holes normally made by carpenter bees so that the hole tends to attract such bees, and said housing containing no bait, the exterior surface of said solid wall around said hole having a light color, and the walls of said housing being opaque so that said hole appears dark from outside the housing, and periodically removing trapped bees from said hollow interior of said housing.

13. The method of trapping carpenter bees as set forth in claim 12 in which at least one of the walls of said housing can be pivoted away from adjacent walls to permit the hollow interior of the housing to be opened for the removal from trapped bees.

14. The method of trapping carpenter bees as set forth in claim 12 in which the interior surfaces of said housing are smooth.

15. The method of trapping carpenter bees as set forth in claim 12 which is made of a single piece of molded plastic with molded hinges connecting selected pairs of adjacent walls, and including integral latching means for releasably latching selected pairs of adjacent walls.

16. The method of trapping carpenter bees as set forth in claim 12 in which said hole has a diameter within the range of from about 5/16 inch to 1/2 inch.

17. A method of trapping carpenter bees without the use of bait or insecticide comprising providing a housing having a hollow interior and at least one solid wall having an exposed hole formed therein to permit carpenter bees to enter the hollow interior of the housing, said hole having about the same size as holes normally made by carpenter bees so that the hole tends to attract such bees, and said housing containing no bait, and periodically removing trapped bees from said hollow interior of said housing, the interior surface of said solid wall forming the interior edge of said hole is substantially flat.

* * * * *

UNITED STATES PATENT AND TRADEMARK OFFICE
CERTIFICATE OF CORRECTION

PATENT NO. : 6,766,611 B2
DATED : July 27, 2004
INVENTOR(S) : Bruce H. Prince

It is certified that error appears in the above-identified patent and that said Letters Patent is hereby corrected as shown below:

Column 4,
Line 1, after "of" add -- a --
Line 4, "on" should read -- one --
Line 20, after "hole" add -- has --
Line 22, after "of" add -- a --
Line 26, "and housing" should read -- said housing --
Line 50, "from" should read -- of --

Signed and Sealed this

First Day of February, 2005

JON W. DUDAS
*Director of the United States Patent and Trademark Office*